Dec. 22, 1936.   J. H. HAMMON   2,065,132
MULTIFOCAL OPHTHALMIC LENS AND BLANK AND METHOD OF MAKING THE SAME
Filed Jan. 18, 1933   3 Sheets-Sheet 1
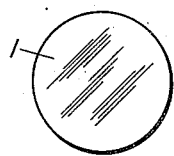
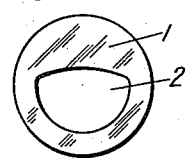
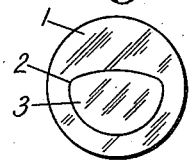
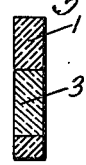
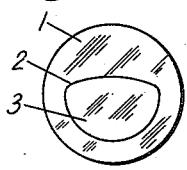
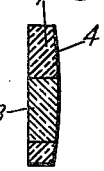
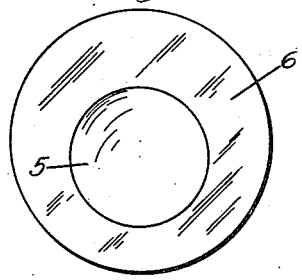
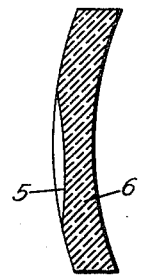
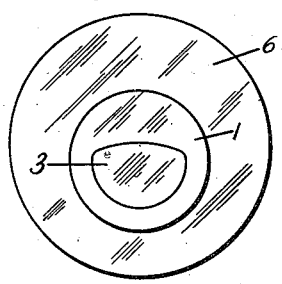
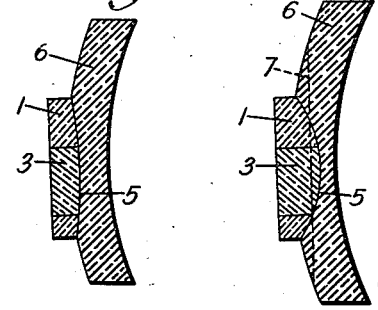
INVENTOR.
James H. Hammon.
BY
ATTORNEYS.

Dec. 22, 1936.  J. H. HAMMON  2,065,132
MULTIFOCAL OPHTHALMIC LENS AND BLANK AND METHOD OF MAKING THE SAME
Filed Jan. 18, 1933   3 Sheets-Sheet 2

INVENTOR.
James H. Hammon
BY Corbett + Mahoney
ATTORNEYS.

Dec. 22, 1936.  J. H. HAMMON  2,065,132
MULTIFOCAL OPHTHALMIC LENS AND BLANK AND METHOD OF MAKING THE SAME
Filed Jan. 18, 1933   3 Sheets-Sheet 3

INVENTOR.
James H. Hammon.
BY Corbett + Maloney
ATTORNEYS.

Patented Dec. 22, 1936

2,065,132

UNITED STATES PATENT OFFICE 2,065,132

MULTIFOCAL OPHTHALMIC LENS AND BLANK AND METHOD OF MAKING THE SAME

James H. Hammon, Vincennes, Ind.

Application January 18, 1933, Serial No. 652,250

15 Claims. (Cl. 88—54)

My invention relates to multifocal ophthalmic lenses and blanks and methods of making the same. It has to do particularly with the making of trifocal lenses, though it is not limited thereto.

One of the objects of this invention is to provide a method of making a trifocal lens wherein the line of demarcation between the reading portion and the intermediate vision portions may be sharply and clearly defined.

Another object of this invention is to provide a method of making a trifocal lens wherein the reading portion and the intermediate vision portions may be of any selected shape.

Another object of this invention is to provide a method of making a trifocal lens wherein the optical centers of the distance, reading and intermediate vision portions may be located at any desired point with relation to each other.

Another object of this invention is to provide a trifocal lens which is of such a construction that it may be economically made and that chromatic aberration may be eliminated.

Other objects and advantages of this invention will appear as this description progresses.

In its preferred embodiment, my invention contemplates the making of a trifocal lens by the forming of a spherical countersink in a main blank of a given index of refraction, the disposition therein of a composite button embodying a carrier button of the same index of refraction having a hole or socket carrying a reading segment button of a greater different index of refraction and of any desired shape. After fusion of these parts together, it contemplates the formation of a second countersink in superimposed relation to that previously formed and of a larger size concentric or eccentric thereto, followed by the disposition in such second countersink of a second composite button embodying a carrier button of the same index as the blank and having an opening or socket of any selected shape in which is mounted an intermediate vision segment button which may be of the same or a different index of refraction as the reading segment button and of the same or different shape. After fusion of these parts, the main blank may be finished to the proper curvature.

The preferred embodiment of my invention is shown in the accompanying drawings wherein similar characters of reference designate corresponding parts and wherein:

Figure 1 is a plan view of a disk of glass, preferably of crown glass which may be used for the making of the first carrier button that I use.

Figure 1a is a projected section of the disc of glass shown in Figure 1.

Figure 2 is a plan view similar to Figure 1 of the carrier button after it has been perforated for the reception of a reading segment button.

Figure 2a is a projected section of the carrier button shown in Figure 2.

Figure 3 is a plan view of a reading segment button designed to be disposed within the opening or socket of the carrier button shown in Figure 2.

Figure 3a is a projected section of the reading segment button shown in Figure 3.

Figure 4 is a plan view of the carrier button of Figure 2 with reading segment button of Figure 3 fused therein.

Figure 4a is a projected section of the carrier button with the reading segment fused therein, shown in Figure 4.

Figure 5 is a plan view similar to Figure 4 with the rear or under surface of the button finished to the approximate curvature of the countersink in which the composite button is to be mounted.

Figure 5a is a projected section of the composite button shown in Figure 5.

Figure 6 is a plan view of a main blank with a countersink ground therein for the reception of the composite button which carries the reading segment button.

Figure 6a is a projected section of the blank shown in Figure 6.

Figure 7 is a plan view similar to Figure 6 but showing the composite button of Figures 5 and 5a fused in the blank countersink.

Figure 7a is a projected section of the blank shown in Figure 7.

Figure 8 is a sectional view of a lens blank such as shown in Figures 7 and 7a but with the curve of the countersink exaggerated and showing by dotted line the curve of the second countersink to be ground into the blank.

Figure 11 is a plan view of the intermediate vision segment button to be introduced into the carrier portion shown in Figures 10 and 10a.

blank 6. It will be seen that this second carrier button is provided with an opening 9 which is formed therein for the reception of an intermediate vision segment button 10 illustrated in Figures 11 and 11a. This intermediate vision segment button may take any desired shape, though it is shown of substantially similar shape to the reading segment button illustrated in Figures 3 and 3a. It should be of sufficient area to entirely cover the reading segment button 3a and to provide an additional field beyond the area of said reading segment button. It is preferably formed of a glass having the same index of refraction as the reading segment button, though not necessarily so.

Figure 9:
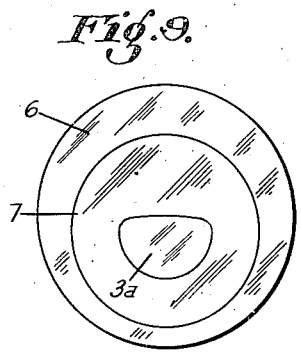
Figure 9 is a plan view illustrating the blank after the second countersink has been ground therein for the reception of the composite button which carries the intermediate vision segment button.
Figure 9A:
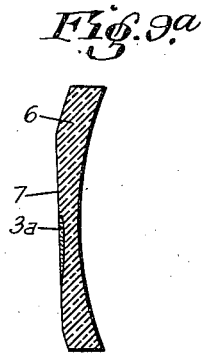
Figure 9a is a projected section of the blank shown in Figure 9.
Figures 10, 10A:
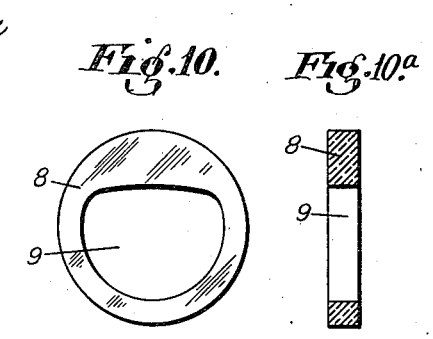
Figure 10 is a plan view of the carrier portion for the intermediate vision segment button.
Figure 10a is a projected section of the carrier portion shown in Figure 10.
Figure 11:
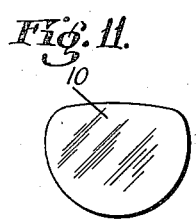
Figure 11A:
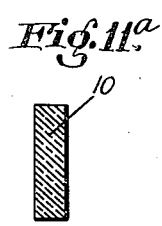
Figures 12, 12A:
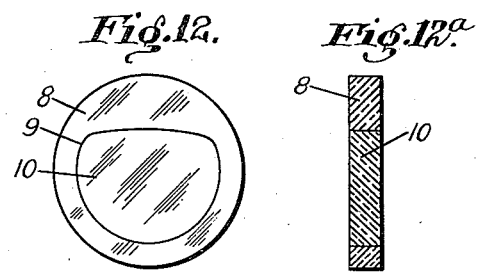
Figures 13, 14, 15:
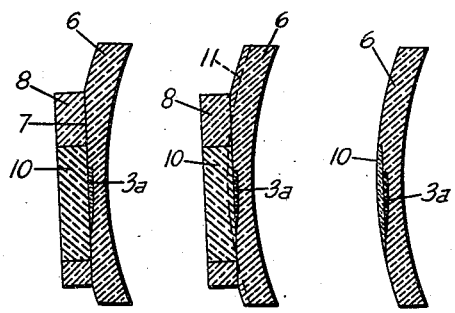
Figure 16:
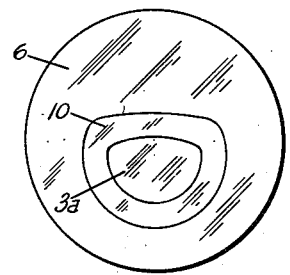
Figure 17:
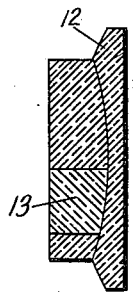
Figure 18:
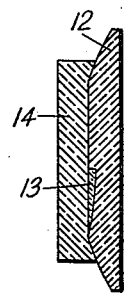
Figure 19:
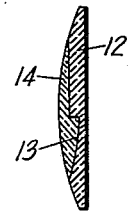
Figure 20:
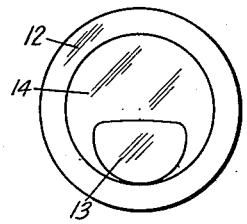
Figure 21:
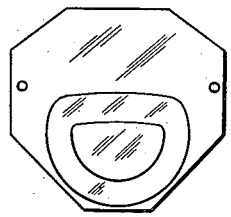
Figure 22:
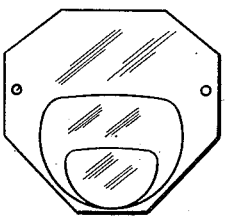
Figure 23:
Figure 24:
Figure 25:
Figure 26:
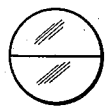
Figure 27:
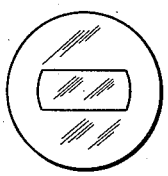
Figure 28:
Figure 29:
Figure 30:
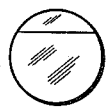
Figure 31:
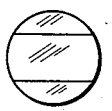

The carrier button of Figures 10 and 10a and the intermediate vision segment button of Figures 11 and 11a are combined by fusing to produce the second composite button illustrated in Figures 12 and 12a. One surface thereof is then preferably finished to approximate the curvature of the countersink in which it is to be fused. It is then placed in the position illustrated in Figure 13 and fused therein. Then, the button carrying side of the blank is finished to the depth indicated by the dotted line 11 in Figure 14, which results in the production of the blank indicated in section in Figure 15 and indicated in plan in Figure 16.

My invention also makes it possible, for the first time, to provide a so-called cataract lens which will be free from the previously customary appearance of abnormal thickness and weight and which may be produced without resorting to the location of segments on both sides of the lens or to the use of cement with its well known drawbacks. Thus, in Figures 17 to 20, I have illustrated a finished cataract lens which embodies a main blank member 12, a reading segment portion 13 composed of a segment of glass of one index of refraction which is fused in a countersink in the face of the blank in the manner illustrated in Figures 1 to 8, inclusive, of the drawings and a distance vision portion 14 composed of a segment of glass of the same index of refraction which may be applied in the manner illustrated in Figures 9 to 16, inclusive, of the drawings. However, the segment forming the reading portion and the segment forming the distance portion may be of different indices of refraction, if desired. It will be readily understood that the production of a cataract lens by this method will result in a fused multifocal lens wherein the reading segment portion and the distance vision portion may be made of adequate focal strength without the previously customary appearance of thickness and weight.

It will be seen that I have provided a method for making a trifocal lens in which, if desired, the reading segment and the intermediate vision segment may be of the same index of refraction so that they become, in effect, a single piece of glass. Moreover, this has been accomplished while, at the same time, using reading segment and intermediate vision segment buttons of initial embedded thickness at their edges so that it is possible to introduce a prism into either or both segments and to locate the base of such prism wherever desired.

It will be understood that my method is such that a lens can be readily made with two or more segmental portions which are either circular in shape or any part of circles, or which may be of irregular shape, elliptical, parallelograms or, in fact, of any selected predetermined shape. At the same time, these segmental portions may be either concentric or eccentric to one another. Some of the shapes which may be selected if desired are shown in Figures 21 to 31, inclusive.

An important advantage of my invention arises from the fact that I have devised a method of making trifocal lenses wherein the reading segment and the intermediate vision segment may be formed of glass having the same index of refraction with a consequent elimination of chromatic aberration. At the same time, I have used segment buttons which are of substantial initial embedded thickness at their edges. One result of this is that the optical centers of both portions may be located at any point either within or outside of the segment while, at the same time, the segments may have any desired shape and any relative location.

Another advantage of my invention arises from the fact that I am able to produce a trifocal lens wherein the reading segment, the intermediate vision segment and the distance vision segment may have their centers located at relatively independent points or at identical points as desired.

Another advantage of my invention consists in the fact that I am enabled to locate a prism either in the reading segment or in the intermediate vision segment or in both, effective in any direction. Moreover, this may be accomplished without varying the initially selected contour or position of such segment, inasmuch as the segment buttons are initially of substantial thickness throughout.

Another advantage of this invention is that I have provided a method of making a trifocal lens wherein any bifocal lens blank may be used to produce a fused trifocal lens or blank, a feature which presents obviously important features from an economic standpoint.

Another advantage of my invention arises from the fact that I am enabled to take an unfinished bifocal lens blank of any manufacture wherein the reading segment button is fused in a countersink of the main body portion and by subjecting it to a few simple operations, convert it into a trifocal lens blank and ultimately into a finished trifocal lens with the intermediate vision segments of any shape and with the optical centers of such segments in any selected relative position. These operations consist in the formation of a countersink in superimposed concentric or eccentric relation to the button of the blank, with the countersink of a different curvature than the base of the reading segment button, and the fusing into said countersink of a composite button in the manner indicated in Figures 9 to 16.

Throughout the specification, I have used the terms "distance portion", "intermediate portion" and "reading portion" as though the reading portion was the smallest area and surrounded or partly surrounded by the intermediate portion which, in turn, was surrounded by the distance portion. However, it is evident that any of these fields of vision could be interchanged, as requirements of individual cases might demand.

Also throughout this specification and the claims, where I use the term "front surface" of the blank or lens, or similar terms, in which the countersinks are formed, I also intend to cover the forming of the countersinks in the rear surface and the placing of the segments therein.

Having thus described my invention, what I claim is:

1. The method of forming a multifocal ophthalmic lens blank which comprises forming a composite button by producing a socket having walls of substantial depth in a selected location within a carrier portion of glass of one index of refraction, fusing a segment of glass of a different index of refraction and of substantial thickness throughout its entire area in the socket in said carrier portion so that it will be laterally surrounded by said carrier portion and will be embedded therein so as to form a buried shoulder extending therearound but will have one face thereof exposed, surfacing the side of said composite button having the exposed face of the segment to form thereon an optical surface of predetermined curvature, forming a countersink in a main blank of an index of refraction different from said segment but the same as said carrier portion and finishing the surface of said countersink to a curvature substantially complemental to the optical surface produced on said composite button, placing the composite button in the countersink in such a manner that the optical surface thereof is in contact with the countersink surface and selectively locating the composite button in said countersink, fusing the composite button to the main blank so as to cause the carrier portion to become a part thereof and the segment to be embedded therein to a substantial extent throughout its entire area, forming a second composite button by producing a socket having walls of substantial depth in a selected location within a carrier portion of glass of the same index of refraction as the main blank, fusing a segment of glass of a different index of refraction and of substantial thickness throughout its entire area in the socket in said carrier portion so that it will be laterally surrounded by said carrier portion and will be embedded therein so as to form a buried shoulder extending therearound but will have one face thereof exposed, surfacing the side of said composite button having the exposed face of said segment to form thereon an optical surface of predetermined curvature, forming a second countersink in superimposed relation to the first countersink on the side of the main blank having the first-named segment embedded therein thereby forming an exposed optical surface on the outer face of the first-named segment and finishing the surface of the countersink to a curvature substantially complemental to the optical surface on the second-named composite button, placing the second composite button in the second countersink in such a manner that the optical surface thereof is in contact with the countersink surface and the exposed face of the segment thereof is in contact with the outer face of the first segment and selectively locating the composite button therein, and fusing the composite button therein so as to cause the carrier portion of said second composite button to become a part of said main blank and to cause the segment carried thereby to be embedded in said main blank to a substantial extent throughout its entire area.

2. The method of forming a multifocal ophthalmic lens blank which comprises forming a composite button by producing a socket having walls of substantial depth in a carrier portion of glass of one index of refraction, fusing a segment of glass of a different index of refraction and of substantial thickness throughout its entire area in the socket in said carrier portion so that it will be substantially laterally surrounded by said carrier portion and will be embedded therein so as to form a buried shoulder substantially therearound but will have one face thereof exposed, forming an optical surface of predetermined curvature on the side of said composite button having the exposed face of the segment, forming a countersink in a main blank of a selected index of refraction and finishing the surface of said countersink to a curvature substantially complemental to the optical surface produced on said composite button, placing the composite button in the countersink in such a manner that the optical surface thereof is in contact with the countersink surface, fusing the composite button to the main blank, forming a second composite button by producing a socket having walls of substantial depth in a carrier portion of glass of a selected index of refraction, fusing a segment of glass of a different index of refraction and of substantial thickness throughout its entire area in the socket in said carrier portion so that it will be substantially laterally surrounded by said carrier portion and will be embedded therein so as to form a buried shoulder substantially therearound but will have one face thereof exposed, forming an optical surface of predetermined curvature on the side of said composite button having the exposed face of the segment, forming a second countersink on the side of the main blank having the first-named segment fused thereto in such a manner as to form an exposed optical surface on the outer face of the first-named segment and finishing the surface of the countersink to a curvature substantially complemental to the optical surface on the second-named composite button, placing the second composite button in the second countersink in such a manner that the optical surface thereof is in contact with the countersink surface and the exposed face of the segment thereof is in contact with the outer face of the first segment, and fusing the second composite button therein.

3. The method of forming a multifocal ophthalmic lens blank which comprises forming a composite button by embedding a segment of glass of a selected index of refraction and of substantial thickness throughout its entire area in a carrier portion of glass of a different index of refraction in such a manner that the segment will be substantially laterally surrounded by the carrier portion and it will have a buried shoulder extending substantially therearound, forming an optical surface on one side of said composite button, the segment having its face located at said side of said composite button exposed, forming an optical surface on a main blank of a selected index of refraction, placing the composite button on said optical surface on the main blank in such a manner that the optical surface thereof is in contact with the optical surface of the main blank, fusing the composite button to the main blank, forming a second composite button by embedding a segment of glass of a selected index of refraction and of substantial thickness throughout its entire area in a carrier portion of glass of a different index of refraction in such a manner that the segment will be substantially laterally surrounded by the carrier portion and it will have a buried shoulder extending substantially therearound, forming an optical surface on one side of said second composite button, the segment thereof having its face located at said side of said composite button exposed, forming a second optical surface on the side of the main blank having the first-named segment fused thereto, placing the second composite button on said second optical surface on the main blank in such a manner that the optical surface thereof is in contact with the optical surface of the main blank, and fusing the second composite button to the main blank.

4. The method of forming a multifocal ophthalmic lens blank which comprises forming a composite button by producing a socket having walls of substantial depth in a carrier portion of glass of one index of refraction, fusing a segment of glass of a different index of refraction and of substantial thickness throughout its entire area in the socket in said carrier portion so that it will be laterally surrounded by said carrier portion and will be embedded therein so as to form a buried shoulder therearound but will have one face thereof exposed, forming an optical surface of predetermined curvature on the side of said composite button having the exposed face of the segment, forming a countersink in a main blank of an index of refraction the same as said carrier portion and finishing the surface of said countersink to a curvature substantially complemental to the optical surface produced on said composite button, placing the composite button in the countersink in such a manner that the optical surface thereof is in contact with the countersink surface, fusing the composite button to the main blank so as to cause the carrier portion to become a part thereof and the segment to be embedded therein to a substantial extent throughout its entire area, forming an optical surface on the side of the main blank having the segment fused thereto in such a manner as to form an exposed optical surface on the outer face of the first-named segment, selecting a second button of glass of an index of refraction different from said main blank and forming an optical surface on one side thereof which is substantially complemental to the optical surface produced on the main blank, placing the second button of glass on the main blank in superimposed relation to said segment and in such a manner that the optical surface thereof will contact with the outer exposed face of said segment, and fusing the second button of glass to the main blank, the second button of glass being adapted to cooperate with said segment to produce a visual field in the finished lens.

5. The method of forming a multifocal ophthalmic lens blank which comprises forming a composite button by embedding a segment of glass of a selected index of refraction and of substantial thickness throughout its entire area in a carrier portion of glass of a different index of refraction in such a manner that the segment will be substantially laterally surrounded by the carrier portion and it will have a buried shoulder extending substantially therearound, forming an optical surface on one side of said composite button, the segment having its face located at said side of said composite button exposed, forming an optical surface on a main blank of a selected index of refraction, placing the composite button on said optical surface on the main blank in such a manner that the optical surface thereof is in contact with the optical surface of the main blank, fusing the composite button to the main blank, forming a second optical surface on the side of the main blank having the first-named segment fused thereto, selecting a second button of glass of an index of refraction different from the main blank and forming an optical surface on one side thereof, placing the second button of glass on the main blank in such a manner that the optical surface thereof will contact with the optical surface of the main blank, and fusing the second button of glass on the main blank.

6. The method of forming a cataract lens blank which comprises forming a composite button by embedding a segment of glass of a suitable index of refraction and of substantial thickness throughout its entire area in a carrier portion of glass of a different index of refraction in such a manner that the segment will be substantially laterally surrounded by the carrier portion and it will have a buried shoulder extending substantially therearound, forming an optical surface on one side of said composite button, the segment having its face located at said side of said composite button exposed, forming an optical surface on a main blank of glass a portion of which is adapted to serve as the non-visual portion of the lens and being of glass of the same index of refraction as said carrier portion but different from said segment, placing the composite button on said optical surface on the main blank in such a manner that the optical surface thereof is in contact with the optical surface of the main blank, fusing the composite button to the main blank so as to cause the carrier portion to become a part of the main blank and the segment to be embedded therein to a substantial extent throughout its entire area, forming a second optical surface on the side of the main blank having the first-named segment fused thereto in such a manner as to form an exposed optical surface on the outer face of the first-named segment, selecting a second button of glass of an index of refraction different from the main blank and forming an optical surface on one side thereof, placing the second button of glass on the optical surface of the main blank in such a manner that the optical surface thereof will contact with the exposed outer face of said segment, and fusing the second button of glass on the main blank, the second button of glass being of such a size and so located relative to said segment fused to the main blank that it will completely cover said segment and will extend beyond the edge thereof, the portion of the second button of glass that covers the segment being adapted to cooperate therewith to form one visual field in the finished lens while the portion that extends beyond said segment is adapted to form a different visual field in the finished lens.

7. The method of forming a multifocal ophthalmic lens blank which comprises forming an optical surface on a segment of glass of a selected index of refraction and of substantial thickness throughout its entire area, forming an optical surface on one side of a main blank of glass of a different index of refraction and embedding said segment in said main blank with the optical surface of the segment in contact with the optical surface of the blank and in such a manner that the segment will be substantially laterally surrounded by the main blank and the segment will have a buried shoulder extending substantially therearound, forming a second optical surface on the side of the main blank having the segment embedded therein in such a manner as to form an exposed optical surface on the outer face of said segment, forming an optical surface on a second segment of glass of a different index of refraction from the main blank and of substantial thickness throughout its entire area and embedding said second segment of glass in the main blank in such a manner that the segment will be substantially laterally surrounded by the main blank and the segment will have a buried shoulder extending substantially therearound and in such a manner that the optical surface of said second segment will be in contact with the outer surface of said first segment, the two segments being adapted to cooperate with each other to form a visual field in the finished lens.

8. The method of forming a multifocal ophthalmic lens blank which comprises embedding a segment of glass of a selected index of refraction and of substantial thickness throughout its entire area in one side of a main blank of glass of a different index of refraction in such a manner that the segment will be substantially laterally surrounded by the main blank and the segment will have a buried shoulder extending substantially therearound and forming an exposed outer surface on said segment, and embedding a second segment of glass of an index of refraction different from that of the main blank and of substantial thickness throughout its entire area in the same side of the main blank in such a manner that the segment will be substantially laterally surrounded by the main blank and the segment will have a buried shoulder extending substantially therearound and in such a manner that the inner surface of the second segment will be in contact with the outer surface of the first segment, the two segments being adapted to cooperate with each other to form a visual field in the finished lens.

9. The method of forming a multifocal ophthalmic lens blank which comprises embedding a segment of glass of a selected index of refraction and of substantial thickness throughout its entire area in one side of a main blank of glass of a different index of refraction in such a manner that the segment will be substantially laterally surrounded by the main blank and the segment will have a buried shoulder extending substantially therearound, forming an optical surface on the side of the main blank having the said segment embedded therein in such a manner as to form an exposed optical surface on the outer face of said segment, and fusing on the said optical surface a segment of glass of an index of refraction different from the main blank in covering relation to said segment and in contact with the outer surface thereof, the two segments being adapted to cooperate with each other to form a visual field in the finished lens.

10. An unfinished blank for making a multifocal ophthalmic lens comprising a main blank portion having a suitable index of refraction, said main blank portion having a countersink formed in one side thereof and an inset segment embedded in said side of said main body portion below the surface of said countersink, said inset segment being of a different index of refraction from the main blank portion and being of less area than the area of said countersink, said segment being embedded in the said main blank portion in such a manner that at least a portion of its edge has a shoulder of material thickness below the surface of the countersink and in such a manner that its outer surface is exposed, a composite button disposed in said countersink surface, said composite button embodying a carrier portion of the same index of refraction as said main blank portion and having a socket with walls of substantial depth formed in a selected location therewithin, a segment of glass of an index of refraction different from the carrier portion and of substantial thickness throughout its entire area disposed in the socket in said carrier portion so that it will be substantially laterally surrounded by said carrier portion and will be embedded therein so as to form a buried shoulder extending substantially therearound but will have one face thereof exposed, the surface of said composite button having the exposed face of the segment being finished to a curvature corresponding substantially to that of the countersink surface, the finished surface of said segment of the composite button being in contact with the outer exposed surface of said first segment, the two segments being adapted to cooperate with each other to produce a visual field in the finished lens.

11. An unfinished blank for making a multifocal ophthalmic lens comprising a main blank portion having a suitable index of refraction, said main blank portion having an optical surface formed on one side thereof and a segment embedded in said side of said main body portion below the optical surface, said segment being of different index of refraction from the main blank portion and being embedded therein in such a manner that at least a portion of its edge has a shoulder of material thickness buried below the optical surface, a composite button disposed on said optical surface, said composite button embodying a carrier portion of glass having a segment of glass of an index of refraction different from said carrier portion embedded therein so that it is substantially laterally surrounded by said carrier portion and has a buried shoulder extending substantially therearound but has one face thereof exposed, the exposed face of said segment of the composite button being in contact with the optical surface formed on said main blank portion.

12. A blank for making a multifocal ophthalmic lens comprising a main blank portion of a suitable index of refraction, said main blank portion having a segment of a different index of refraction from the main blank portion embedded in one side thereof in such a manner that at least a portion of its edge has a shoulder of material thickness embedded in the main blank portion, a second segment of glass of a different index of refraction from the main blank portion embedded therein so that it will be laterally surrounded by the main body portion and will have a buried shoulder extending therearound, said second segment being embedded in the same side of the main blank portion as the first segment above the first segment and the inner surface of said second segment being in contact with the outer surface of said first segment, the two segments being adapted to cooperate with each other to produce a visual field in the finished lens.

13. A blank for making a multifocal ophthalmic lens comprising a main blank portion of a suitable index of refraction having a segment of a different index of refraction embedded in one side thereof, a second segment of glass of a different index of refraction from the main blank portion embedded in the same side of said main blank portion above the first segment, the inner surface of said second segment being in contact with the outer surface of said first segment, one of said segments being of substantial thickness throughout its entire area and being embedded in the main blank portion in such a manner that it will be substantially laterally surrounded by the main blank portion and will have a buried shoulder extending substantially therearound, the two segments being adapted to cooperate with each other to produce a visual field in the finished lens.

14. An unfinished blank for making a multifocal ophthalmic lens comprising a main blank portion having a suitable index of refraction, said main blank portion having an optical surface formed on one side thereof and an inset segment embedded in said side of said main body portion below the optical surface, said inset segment being of a different index of refraction from the main blank portion and being embedded therein in such a manner that it is laterally surrounded by said main blank portion and at least a portion of its edge has a shoulder of substantial thickness buried below the optical surface but its outer surface is exposed, a second segment of glass of an index of refraction different from the main blank portion and having one side thereof finished to form an optical surface which is substantially complemental to the optical surface on said main blank portion, said second segment of glass being of substantial thickness throughout its entire area and being disposed on the main blank with its optical surface in contact with the optical surface of the main blank, said second segment being disposed in covering relation to the first segment and the inner surface of said second segment being in contact with the outer surface of said first segment, said second segment extending beyond the area of the first segment, the portion of said second segment which covers the first segment being adapted to cooperate therewith to form a visual field in the finished lens and the portion of said second segment which extends beyond the first segment being adapted to form a different visual field in the finished lens.

15. An unfinished blank for making a cataract lens comprising a main blank having a portion which serves as a non-visual portion, said main blank having an optical surface formed on one side thereof and an inset segment embedded in said side of said main blank below the optical surface, said inset segment being of a different index of refraction from the main blank and being embedded therein in such a manner that it is substantially laterally surrounded by said main portion but its outer surface is exposed, at least a portion of the edge of said segment having a shoulder of substantial thickness buried below the optical surface of said main blank, a segment of glass of a different index of refraction from the main blank and having one side thereof finished to form an optical surface which is substantially complemental to the optical surface on said main blank, said second segment of glass being disposed on the main blank with its optical surface in contact with the optical surface of the main blank, said second segment being disposed above the first segment and the inner surface of said second segment being in contact with the outer surface of said first segment, the two segments being adapted to cooperate with each other to produce a visual field in the finished lens.

JAMES H. HAMMON.